(12) United States Patent
Lorenz et al.

(10) Patent No.: US 6,835,459 B2
(45) Date of Patent: Dec. 28, 2004

(54) CONDUCTIVE ORGANIC COATINGS

(75) Inventors: Wolfgang Lorenz, Erkrath (DE); Andreas Kunz, Remscheid (DE); Eva Wilke, Haan (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 218 days.

(21) Appl. No.: 10/275,538

(22) PCT Filed: Apr. 27, 2001

(86) PCT No.: PCT/EP01/04779

§ 371 (c)(1),
(2), (4) Date: Nov. 6, 2002

(87) PCT Pub. No.: WO01/85860

PCT Pub. Date: Nov. 15, 2001

(65) Prior Publication Data

US 2003/0175541 A1 Sep. 18, 2003

(30) Foreign Application Priority Data

May 6, 2000 (DE) .......................... 100 22 075

(51) Int. Cl.$^7$ ............................. B32B 15/04; B05D 7/14
(52) U.S. Cl. ...................... 428/469; 252/502; 252/503; 252/506; 252/510; 252/511; 252/512; 252/518.1; 252/521.2; 427/402; 427/404; 427/407.1; 427/417; 427/418; 427/419.1; 427/419.2; 428/546; 428/411.1; 428/457; 428/472.1; 428/472.2; 428/472.3; 428/931
(58) Field of Search ............................... 428/469, 546, 428/411.1, 457, 472.1, 472.2, 472.3, 931; 427/402, 404, 407.1, 417, 418, 419.1, 419.2, 502, 503, 506, 510

(56) References Cited

U.S. PATENT DOCUMENTS 3,998,771 A 12/1976 Feneis, Jr. et al.
4,186,036 A 1/1980 Elms et al.
4,775,600 A 10/1988 Adaniya et al.
6,126,730 A * 10/2000 Yoshida et al. ............. 428/469

FOREIGN PATENT DOCUMENTS

| CA | 2 317 524 | | 5/1999 |
| DE | 34 12 234 | A1 | 10/1985 |
| DE | 36 40 662 | A1 | 10/1987 |
| DE | 197 48 764 | A1 | 5/1999 |
| DE | 199 51 133 | A1 | 4/2001 |
| EP | 0 380 024 A2 | A3 | 8/1990 |
| EP | 0 573 015 | A1 | 12/1993 |
| WO | WO 99/24515 | A1 | 5/1999 |

OTHER PUBLICATIONS

Salt spray testing (DIN 50 021) Beuth Verlag DmbH, Berlin, pp. 1–6 (1988); Jun. 1988.

Testing of leather; determinatin of colour and finishing fastness to rubbing (DIN 53 339) Alleinverkauf der Normen durch, Beuth Verlag GhbH, Berlin, pp. 1–2 (1978); Jan. 1978.

* cited by examiner

*Primary Examiner*—Robert R. Koehler
(74) *Attorney, Agent, or Firm*—Stephen D. Harper

(57) ABSTRACT

A conductive and weldable anti-corrosion composition for coating metal surfaces which contains:
(a) 5 to 40 wt. % of an organic binder containing:
　(aa) at least one epoxide resin
　(ab) at least one hardener selected from cyanoguanidine, benzoguanamine and plasticised urea resin
　(ac) at least one amine adduct selected from polyoxyalkylenetriamine and epoxide resin/amine adducts
(b) 0 to 15 wt. % of an anti-corrosion pigment
(c) 40 to 70 wt. % of a conductive pigment selected from powdered zinc, aluminum, graphite, molybdenum sulfide, carbon black and iron phosphide
(d) 0 to 45 wt. % of a solvent;
and a lacquered metal structural part which has a conductive organic layer.

4 Claims, No Drawings

CONDUCTIVE ORGANIC COATINGS

BACKGROUND OF THE INVENTION

1. Field of the Invention

This invention relates to conductive and weldable anti-corrosion compositions for coating metal surfaces and a process for coating metal surfaces with electrically conductive organic coatings.

In the metal-processing industry, in particular when constructing vehicles, the metal constituents for the product have to be protected against corrosion. According to the traditional prior art, the sheet metal is first coated with anti-corrosion oils in the rolling mill and optionally coated with drawing compounds prior to forming and punching. In the vehicle construction sector, appropriately shaped sheet metal parts are cut out for vehicle bodies or body parts and shaped using such drawing compounds or oils in a deep-drawing process, then they are assembled, generally by means of welding and/or flanging and/or bonding, and finally cleansed in a costly procedure. Anti-corrosion surface treatments, such as phosphatising and/or chromatising, then follow, whereupon a first lacquer layer is applied to the structural parts using electrodeposition. In general, this first electrodeposition process, in particular in the case of car bodies, is followed by the application of several more layers of lacquer.

In the metal processing industry, such as in the vehicle and domestic appliance construction sectors, in order to simplify the process, there is a requirement to reduce the cost of chemical anti-corrosion treatment. This may be achieved by providing the raw material in the form of metal sheets or metal strips which have already been provided with an anti-corrosion layer.

There is, therefore, a need to find simpler methods of production in which pre-coated sheets may be welded and then lacquered in an electrodeposition process in the well-proven manner. Thus, there are a number of processes in which, following phosphatising and/or chromatising in a so-called coil-coating process, an organic coating, which may conduct electricity to a greater or lesser extent, is applied. These organic coatings should as a rule be made up in such a way that they have sufficient electrical conductivity not to be impaired by the typical welding processes used in the car industry, for example electrical spot-welding. In addition, these coatings should be overpaintable with conventional electrodeposition lacquers.

In particular in the car industry, in addition to normal steel sheeting, steel sheeting which has been galvanised and/or alloy galvanised in a variety of processes, has been used to an increasing extent recently.

2. Description of the Related Art

The coating of steel sheeting with organic coatings which are weldable and which are applied directly in the rolling mill by the so-called coil-coating process is known in principle.

Thus, DE-C-3412234 describes a conductive and weldable anti-corrosion primer for electrolytically thin-layer galvanised, phosphatised or chromatised and drawable steel sheeting. This anti-corrosion primer consists of a mixture of more than 60% zinc, aluminum, graphite and/or molybdenum disulfide and also another anti-corrosion pigment and 33 to 35% of an organic binder and about 2% of a dispersion agent or catalyst. Polyester resins and/or epoxide resins and derivatives thereof are proposed as organic binders. It is assumed that this technology is the basis of the coating agent known in the industry by the name "Bonazinc 2000". Although this process provides some advantages as compared with the procedure described above (temporary corrosion protection with anti-corrosion oils followed by subsequent degreasing after assembling the metallic components), the process described in DE-C-3412234 still requires much improvement:

The coating is not sufficiently spot-weldable.

Adhesion of the lacquer to the pretreated substrates, preferably galvanised steels, is not always adequate, in particular when more severe forming of the sheeting is performed in car presses.

In accordance with the disclosure in DE-C-3412234, the organic binder may consist of polyester resins and/or epoxide resins and derivatives thereof. Specific examples mentioned are an epoxide/phenyl precondensate, an epoxy ester and linear oil-free mixed polyesters based on terephthalic acid.

EP-A-573015 describes an organic-coated steel composite sheet, one or both surfaces of which are coated with zinc or a zinc alloy, which is provided with a chromate film and an organic coating applied thereto which has a layer thickness of 0.1 to 5 $\mu$m. The organic coating is formed from a primer composition which consists of an organic solvent, an epoxide resin having a molecular weight between 500 and 10,000, an aromatic polyamine and a phenol or cresol compound as accelerator. Furthermore, the primer composition contains a polyisocyanate and colloidal silica. In accordance with the disclosure in this document, the organic coating is preferably applied so that the dry film layer thickness is 0.6 to 1.6 $\mu$m, since layers thinner than 0.1 $\mu$m are too thin to provide corrosion protection. Layers thicker than 5 $\mu$m, however, impair weldability. In an analogous manner, DE-A-3640662 describes a surface-treated steel sheet consisting of a zinc-coated or zinc alloy-coated steel sheet, a chromate film produced on the surface of the steel sheet and a layer of a resin composition produced on the chromate film. This resin composition consists of a basic resin, which is prepared by reacting an epoxide resin with amines, and a polyisocyanate compound. This film should also be used with a dry film thickness of less than about 3.5 $\mu$m, because thicker layers greatly reduce the weldability.

EP-A-380 024 describes organic coating materials based on a bisphenolA- type epoxide resin having a molecular weight between 300 and 100,000 and also a polyisocyanate or blocked polyisocyanate, pyrogenic silica and at least one organic coloring pigment. A chromate-containing pretreatment with a high application of Cr is also required in this process. The organic layer should be not thicker than 2 $\mu$m since sheets with thicker organic layers do not enable satisfactory spot-welding and there is a negative effect on the properties of the electrodeposition lacquer applied to the organic coating.

WO 99/24515 discloses a conductive and weldable anti-corrosion composition for coating metal surfaces, characterised in that it contains:
(a) 10 to 40 wt. % of an organic binder containing:
  (aa) at least one epoxide resin
  (ab) at least one hardener selected from guanidine, substituted guanidines, substituted ureas, cyclic tertiary amines and mixtures thereof
  (ac) at least one blocked polyurethane resin
(b) 0 to 15 wt. % of an anti-corrosion pigment based on silicate
(c) 40 to 70 wt. % of powdered zinc, aluminium, graphite and/or molybdenum sulfide, carbon black, iron phosphide
(d) 0 to 30 wt. % of a solvent.

There is a need to provide improved coating compositions which satisfy the requirements of the car industry in all respects. In comparison to the prior art, the following properties of organic coating compositions suitable for the coil-coating process should be improved:

- a clear reduction in white rust on galvanised steel sheeting in the spray test according to DIN 50021, i.e. better corrosion protection,
- an improvement in adhesion of the organic coating to the metallic substrate in accordance with an evaluation by the T-bend test (ECCA standard) and impact test (ECCA standard),
- ability to form an external skin (i.e. capacity for use as external sheet in a car body)
- adequate corrosion protection, even with low rates of Cr, preferably also with Cr-free pretreatment processes,
- the currently still conventional cavity sealing with wax or wax-containing products may become unnecessary due to the improved corrosion protection
- adequate suitability for typical car welding processes.

BRIEF SUMMARY OF THE INVENTION

The present invention provides a conductive and weldable anti-corrosion composition for coating metal surfaces, characterised in that it contains, based on the total composition:
(a) 5 to 40 wt. % of an organic binder containing:
  (aa) at least one epoxide resin
  (ab) at least one hardener selected from cyanoguanidine, benzoguanamine and plasticised urea resin
  (ac) at least one amine adduct selected from polyoxyalkylenetriamine and epoxide resin/amine adducts
(b) 0 to 15 wt. % of an anti-corrosion pigment
(c) 40 to 70 wt. % of a conductive pigment selected from powdered zinc, aluminum, graphite, molybdenum sulfide, carbon black and iron phosphide
(d) 0 to 45 wt. % of a solvent,
and, if required, up to 50 wt. % of other active or auxiliary substances, wherein the proportions of the components total 100%.

DETAILED DESCRIPTION OF THE INVENTION

A coating is to be understood to be electrically conductive, in the context of the present invention, when it may be welded, after curing, under the conventional conditions for joint technology in the car industry, in particular after a spot-welding process. Furthermore, these coatings have sufficient electrical conductivity to ensure the complete deposition of electrodeposition lacquers.

An essential constituent of the organic binder in the anti-corrosion composition according to the present invention is the epoxide resin. One epoxide resin or a mixture of several epoxide resins may be used. The epoxide resin(s) may have a molecular weight between 300 and 100,000; epoxide resins having at least two epoxy groups per molecule which have a molecular weight of greater than 700 are preferably used because, from experience, epoxides having higher molecular weights do not lead to occupational health and safety problems during application. Basically, a large number of epoxides may be used, such as the glycidyl ethers of bisphenol A or the glycidyl ethers of Novolac resins. Examples of the former type are those sold by Shell Chemie under the tradenames Epicote 1001, Epicote 1004, Epicote 1007, Epicote 1009. A number of other commercially available epoxide resins of the bisphenolA-/glycidyl ether type may also be used, as well as the epoxide resins mentioned above. Examples of Novolac epoxide resins are the Araldit ECN products from Ciba Geigy, the DEN products from Dow Chemicals and also a number of other manufacturers.

Furthermore, epoxide group-containing polyesters may be used as epoxide resin binder components, these also including the epoxy derivatives of dimeric fatty acids.

These epoxide resins to be used according to the present invention are preferably solid, in the solvent-free state, at room temperature. When preparing the composition, they are used as a solution in an organic solvent.

An epoxide based on bisphenol A glycidyl ether having a molecular weight of at least 800 is also preferred as an epoxide resin.

To harden the epoxide resin, the composition contains at least one hardener selected from cyanoguanidine, benzoguanamine, plasticised urea resin and mixtures thereof. The binder and hardener are preferably present in a ratio, by weight, of 0.8:1 to 7:1.

As another component, the organic binder also contains at least one amine adduct selected from polyoxyalkylenetriamine and epoxide resin/amine adducts. Obviously, the binder may also contain a mixture of several such adducts. The total amount of epoxide resin to the total amount of amine adducts mentioned is preferably in the ratio, by weight, of 4:1 to 9:1, in particular 5:1 to 8:1.

As component (b), anti-corrosion pigments may be present in an amount of up to 15 wt. %. The composition preferably contains 2 to 10 wt. % of anti-corrosion pigment, selected from doped silicas, silicates of divalent metals, in particular calcium-containing modified silicates, aluminum and zinc phosphates and modification products thereof and surface-modified titanium dioxide.

The agent contains, as conductive pigment (c), a powder of an electrically conductive substance which enables the coated metal surfaces to be electrically welded and electrophoretically lacquered, for example by cathodic electrodeposition lacquering. The electrically conductive substance is preferably selected from zinc, aluminum, graphite, carbon black, molybdenum sulfide and/or iron phosphide, each being in the powdered form. Powdered iron phosphide is preferably used and this preferably has an average particle size of not more than 10 $\mu$m. This type of powder may be obtained by milling a more coarsely divided powder. The average particle size is preferably in the range 2 to 8 $\mu$m. Known methods, such as light scattering or electron microscopy, are available for determining particle sizes.

The anti-corrosion composition also contains 0 to 30 wt. % of a solvent or a solvent mixture, wherein some of this solvent or solvent mixture may be incorporated by means of the epoxide resin component or other components of the binder. This applies in particular when commercially available binder components are used in the agent. Suitable solvents are solvents based on ketones which are normally used in lacquer technology, such as methyl ethyl ketone, methyl isobutyl ketone, methyl n-amyl ketone, ethyl amyl ketone, acetylacetone, diacetone alcohol and also γ-butyrolactam and N-alkylated products thereof which contain alkyl groups having 1 to 3 carbon atoms. Furthermore, aromatic hydrocarbons, such as toluene, xylene or mixtures thereof, may be used, and also aliphatic hydrocarbon mixtures having boiling points between about 80 and 180° C. Other suitable solvents are, for example, esters, such as ethyl acetate, n-butyl acetate, isobutyl isobutyrate, or alkoxyalkyl acetates, such as methoxypropyl acetate or 2-ethoxyethyl acetate. Furthermore, monofunctional alcohols such as isopropyl alcohol, n-butanol, methylisobutylcarbinol or 2-ethoxyethanol or monoalkyl ethers of ethylene glycol, diethylene glycol or propylene glycol may be mentioned as representative of many suitable solvents. It may be expedient to use mixtures of the previously mentioned solvents.

In particular, solvent (d) may be selected from diacetone alcohol, butyldiglycol acetate, aromatic compound-rich hydrocarbons, xylene, 3-methoxybutyl acetate, methoxyacetoxypropane, benzyl alcohol or butanol.

The composition may contain, as optional other active or auxiliary substances, one or more substances selected from modified castor oil, modified polyethylene wax and polyethersiloxane copolymers.

One particular advantage of the composition according to the present invention is that the organic binder component may contain no isocyanates. This means that the health risks associated with the use of isocyanates are avoided.

The agent according to the present invention is particularly suitable for use in the so-called coil-coating process. Here, metal strips are continuously coated. The agent may be applied by a variety of methods which are commonplace in the prior art. For example, application rollers may be used which may be adjusted directly to give the desired wet film thickness. Alternatively, the metal strip may be dipped in the agent or it may be sprayed with the agent.

Provided metal strips which have been coated immediately beforehand, in an electrolytic or melt-dip process, with a layer of metal, for example with zinc or zinc alloys, are coated, then cleansing of the metal surfaces prior to applying the agent is not required. However, if the metal strips have been stored for a time and in particular if they have been treated with anti-corrosion oils, then a cleansing step is required. The agent according to the present invention may be applied directly to the cleansed or polished, depending on the method of manufacture, metal surface. The anti-corrosion effect which may be produced may be improved, however, if the metal surface is subjected to an anti-corrosion pretreatment using inorganic reagents prior to applying the agent, using the technique known in the prior art as "conversion treatment". This may be, for example, a phosphatising process, in particular layer-forming zinc phosphatising, a chromatising process or a conversion treatment using chromium-free treatment agents, for example one based on the complex fluorides of titanium and/or zirconium. These types of pretreatment processes are known from the prior art. If a chromatising process is selected as a pretreatment, this is preferably performed in such a way that a chromium application of not more than 30 mg per $m^2$, for example 20 to 30 mg of chromium per $m^2$, is obtained. Higher rates of application of chromium are not required.

The agent according to the present invention is preferably applied to the metal surface at a wet film thickness such that, after curing, the resulting layer has a thickness of about 1 to about 10 $\mu$m. Layers having thicknesses in the range of about 8 $\mu$m, for example 5 to 9 $\mu$m, are preferably produced. The organic coating is cured by heating the coated metal surface to an object temperature (PMT=peak metal temperature) in the range 160 to 260° C. The preferred PMT is in the range 230 to 260° C.

To cure the coating on the substrate, the coated substrate is heated until the temperature has risen to a value within the range mentioned. This heating procedure may take place, for example, in a heated furnace, in particular in a continuous furnace, which must generally have a temperature well above the PMT and is preferably operated with circulating air. The furnace temperature may be, for example, 350° C., wherein the PMT may be controlled via the residence time of the coated substrate in the furnace zone. The procedure is preferably such that the substrate is not held at the PMT for an extended period, but is allowed to cool down immediately after reaching the PMT. Active cooling measures, such as cooling with water or blowing with air may be provided for this purpose. The time up to reaching the PMT may be less than one minute, for example about 30 seconds, when applied as a coil-coating process.

Accordingly, in another embodiment, the present invention also provides a process for coating metal surfaces with a conductive organic anti-corrosion layer characterised by the following steps:

(i) a conventional pretreatment consisting of:

cleansing phosphatising, if required chromatising, if required chromium-free pretreatment, if required (ii) coating with a composition as claimed, in a layer thickness of 1 to 10 $\mu$m, preferably between 5 and 9 $\mu$m (iii) curing the organic coating at temperatures between 160 and 260° C. peak metal temperature (PMT).

The metal surfaces to be coated are preferably selected from surfaces of steel which have been galvanised or alloy galvanised, electrolytically or in a hot dip process, or of aluminum. Examples of alloy galvanised steels are the materials Galvannealed® (Zn/Fe alloy), Galfan® (Zn/Al alloy) and Zn/Ni alloy coated steel.

Furthermore, the present invention relates to a metal object having an anti-corrosion layer which is obtainable by the process according to the present invention. The anti-corrosion layer produced according to the present invention may also be overpainted with further layers of lacquer.

When using metal parts coated according to the present invention, for example in the vehicle construction sector and in the domestic appliance industry, chemical treatment stages for the anti-corrosion treatment of the final structural parts are not required. The assembled structural parts which have a coating according to the present invention may be directly overpainted, for example by powder coating or by electrolytic dip lacquering. In places where overpainting cannot take place, for example in cavities in vehicle bodies, metal parts coated according to the present invention have an adequately high resistance to corrosion. Costly working procedures, such as cavity conservation are not required here. This simplifies the finishing processes involved in vehicle construction and this also leads to a saving in weight compared with conventional cavity sealing processes, and thus to a lower fuel consumption.

One advantage of a material coated according to the present invention is the fact that it may be used as an 'external skin' when constructing a vehicle. The number of welding points per electrode which may be achieved during resistance spot welding is higher than for the prior art coatings cited above. When applied to the material Galvannealed®, which is known to be brittle and difficult to thermoform by pressing, it exhibits very good pressing behavior, so that less abrasion is produced during pressing. Furthermore, the 'cratering' (defects in the lacquer) which is known to occur during cathodic electrodeposition lacquering of Galvannealed® is prevented.

The conductive organic layer produced by the present process thus provides a base for further overpainting, as is generally conventional in the metal construction industry. A powder coating layer, for example, may be applied to the conductive organic layer. Thus, the present invention, in an extended embodiment, relates to a metal object which has a coating system on the metal surface consisting of the following individual layers:

(a) a chemical conversion layer,
(b) a conductive organic layer having a thickness of 1 to 10 μm, containing at least an organic binder and an electrically conductive substance,
(c) a powder coating layer having a thickness of 70 to 120 μm.

A powder coating is conventionally used in particular for machine construction, metal parts for the internal structure of buildings and in the furniture and domestic appliance industry. In the vehicle construction sector, due to the higher degree of mechanical and corrosive strain, a multi-layered system in which a differentiated sequence of organic coatings is applied on top of a chemical conversion layer is currently preferred. In this sequence, a conductive organic layer follows on top of the conversion layer, as the first organic layer. Then, a simplified layer structure, as compared to that used in the prior art, may follow consisting of an electrodeposition lacquer and one or two layers of top-coat. Since the underlying material has already been provided with the conductive organic layer, the steps required by the vehicle manufacturer to produce a chemical conversion layer and to apply the various organic coatings are simplified.

The present invention thus also includes a metal object which has, on the metal surface, a coating system consisting of the following individual layers:

(a) a chemical conversion layer,
(b) a conductive organic layer having a thickness of 1 to 10 μm, containing at least an organic binder and an electrically conductive substance,
(c) an electrodeposition lacquer having a thickness of 25 to 35 μm
(d) one or two layers of topcoat.

Hitherto, it has not been conventional in the prior art to apply an electrodeposition lacquer onto an organic layer. According to the present invention, an electrodeposition lacquer having a thickness in the range 25 to 35 μm may be applied to the conductive organic layer. This is a much thicker layer than is conventional in the prior art, where an electrodeposition lacquer having a thickness of about 20 μm is deposited directly onto a chemical conversion layer. In the prior art, as described hitherto, a filler follows the electrodeposition lacquer and only then are one or two layers of topcoat applied. In accordance with the present invention, the filler layer may be dispensed with since its function (in particular increasing the resistance to impact by stones) is taken over by the electrodeposition lacquer. Therefore, one lacquering step is saved. In addition, the entire coating system in accordance with the present invention is thinner than is conventional in the prior art. This means that materials are saved, which leads to economic and ecological advantages.

The topcoat may be specified as a single layer or two layers. In the two-layered specification, it consists of a so-called basecoat, which primarily provides optical effects in the coating system, and a clear coat which has a substantially protective function and through which the basecoat is visible.

In the two previously described cases, the chemical conversion layer may be a coating which is produced by a conversion treatment as described further above, for example by a phosphatising or chromatising process or a conversion treatment using chromium-free treatment agents. The conductive organic layer (b) provided may be a layer which is obtainable by the previously described process according to the present invention. Another process for applying a conductive organic layer is known from DE 199 51 133, which is not a prior publication. The layer described there has the advantage of curing at a temperature (PMT) in the range 130 to 159° C. Therefore it may also be used for so-called bake-hardening steels. With regard to this, the present invention relates to a metal object of the previously described type, in which the conductive organic layer (b) is obtained by applying a coating agent having the composition:

(i) 10 to 30 wt. % of an organic binder which cures at a temperature of 140 to 159° C., preferably between 149 and 159° C.,
(ii) 30 to 60 wt. % of a powder of an electrically conductive substance,
(iii) 10 to 40 wt. % of water and
(iv) if required, a total of up to 30 wt. % of other active and/or auxiliary substances, wherein the amounts total 100 wt. %, to the metal surface provided with chemical conversion layer (a) and cured at a peak metal temperature in the range 130 to 159° C.

The present invention also includes the processes for coating a metal object which lead to the previously described metal objects. This provides a process for coating a metal object, characterised in that the following layers are applied in sequence to at least part of the surface of the metal object:

(a) a chemical conversion layer,
(b) a conductive organic layer having a thickness of 1 to 10 μm, containing at least an organic binder and an electrically conductive substance,
(c) an electrodeposition lacquer having a thickness of 25 to 35 μm,
(d) a powder coating having a thickness of 70 to 120 μm.

Furthermore, this provides a process for coating a metal object, characterised in that the following layers are applied in sequence to at least part of the surface of the metal object:

(a) a chemical conversion layer,
(b) a conductive organic layer having a thickness of 1 to 10 μm, containing at least an organic binder and an electrically conductive substance,
(c) an electrodeposition lacquer having a thickness of 25 to 35 μm,
(d) one or two layers of topcoat.

Reference is made here to the previous explanations relating to the individual layers (a) to (d).

EXAMPLES

The following Tables give examples of compositions. Sample sheets of electrolytically galvanised steel, which are coated with a conventional industrial chromatising layer and on which the conductive organic coating is cured at a PMT of 235–250° C. to give a layer having a thickness in the range 5 to 9 μm, produced the following results in conventionally used application tests: solvent resistance according to the methyl ethyl ketone test, as described in DIN 53339: more than 10 double wipes; corrosion effects after 10 cycles in a variable climate test in accordance with VDA 621-415: red rust on the flange: r0, lacquer creep corrosion at a scratch (half scratch width) <1.5 mm.

TABLE 1

Example compositions (in wt. %)

| Example no./Component | 1 | 2 | 3 | 4 | 5 |
|---|---|---|---|---|---|
| Toluylene diisocyanate | | | | | |
| Cyanoguanidine | 2.3 | | 1.6 | 2.6 | 2.7 |
| Butyl diglycol (from binder) | 1.5 | 0.7 | 0.7 | 1.6 | 1.7 |
| Hexamethylene diisocyanate | | | | | |
| Plasticised urea resin | | | 1.5 | | |
| Doped silica | 4.1 | 5.0 | 4.5 | 4.1 | 4.8 |
| Glycol ether (Dowanol ® PMA) | | | 14.0 | 6.6 | |
| Glycol ether (Dowanol ® PM) | 5.3 | 15.2 | | | |
| Polyalkoxyalkylenetriamine | | | | | |
| Polyethersiloxane copolymer | | | | | |
| Bisphenol A resin | 7.0 | 5.5 | 5.0 | 7.7 | 8.2 |
| Zinc dust | | 5.0 | | | |
| N-methylation product of γ-butyrolactam | 3.1 | | | 3.1 | 3.5 |
| Benzoguanamine | | | 1.3 | | |
| Isophorone diisocyanate | | | | 2.0 | |
| Diphenylmethane diisocyanate | | 2.5 | 2.0 | | |
| Diacetone alcohol | 8.8 | | 9.0 | 9.6 | 10.2 |
| Butyldiglycol acetate | 15.5 | 17.0 | 10.0 | 9.3 | 4.8 |
| Aromatic-rich hydrocarbon (Solvesso ® 200) | 2.3 | | 2.0 | 6.6 | 2.7 |
| Xylene | 1.3 | 0.6 | | | |
| 3-methoxybutyl acetate | | | | | |
| Dispersion aid | | | | | 0.4 |
| Modified PE wax | 0.4 | 0.2 | | | |
| Iron phosphide | 45.3 | 45.0 | 47.0 | 41.4 | 52.6 |
| Benzyl alcohol | | | | | 4.8 |
| Butanol | 1.5 | 0.7 | 0.7 | 1.6 | 1.7 |
| Epoxy-modified amine adduct | 1.6 | 1.3 | | 1.6 | 1.9 |
| Modified castor oil | | | | 0.2 | |
| Aluminum | | | | 4.0 | |
| Molybdenum sulfide | | | | | |
| Surface-modified Ti oxide | | | | | |
| Total solids | 60.7 | 65.8 | 63.6 | 61.6 | 70.6 |
| Total pigment content | 49.4 | 55.0 | 51.5 | 49.5 | 57.4 |
| Total binder content | 11.3 | 10.8 | 12.1 | 12.1 | 13.2 |

| Example no./Component | 6 | 7 | 8 | 9 | 10 |
|---|---|---|---|---|---|
| Toluylene diisocyanate | | | | 3.0 | |
| Cyanoguanidine | 2.7 | 2.2 | | | 2.3 |
| Butyl diglycol (from binder) | 1.7 | 1.3 | 0.7 | 0.5 | 1.5 |
| Hexamethylene diisocyanate | | | | | |
| Plasticised urea resin | | | | | |
| Doped silica | 4.8 | 5.0 | 7.0 | 5.0 | 4.1 |
| Glycol ether (Dowanol ® PMA) | | | | | |
| Glycol ether (Dowanol ® PM) | | | 15.2 | | 11.0 |
| Polyalkoxyalkylenetriamine | 2.5 | | | 5.0 | |
| Polyethersiloxane copolymer | | | | | |
| Bisphenol A resin | 8.2 | 6.5 | 5.5 | 5.3 | 7.0 |
| Zinc dust | | | | 8.7 | |
| N-methylation product of γ-butyrolactam | | 9.5 | | | 3.1 |
| Benzoguanamine | | | 1.3 | | |
| Isophorone diisocyanate | | | | | |
| Diphenylmethane diisocyanate | | | 2.5 | | |
| Diacetone alcohol | 10.2 | 8.0 | | 5.0 | 8.8 |
| Butyldiglycol acetate | 7.9 | | 22.0 | | |
| Aromatic-rich hydrocarbon (Solvesso ® 200) | 2.7 | 2.2 | | | 2.3 |
| Xylene | | 1.1 | 0.6 | | |
| 3-methoxybutyl acetate | | | | 11.0 | 10.7 |
| Dispersion aid | | | | | 0.8 |
| Modified PE wax | | | 0.4 | 0.2 | |
| Iron phosphide | 52.6 | 45.0 | 43.0 | 42.3 | 45.3 |
| Benzyl alcohol | 5.0 | 15.0 | | 13.3 | |
| Butanol | 1.7 | 1.3 | 0.7 | 0.5 | 1.5 |
| Epoxy-modified amine adduct | | | 1.3 | | 1.6 |
| Modified castor oil | | 2.5 | | 0.4 | |
| Aluminum | | | | | |
| Molybdenum sulfide | | | | | |
| Surface-modified Ti oxide | | | | | |
| Total solids | 70.8 | 61.6 | 60.8 | 69.7 | 61.1 |
| Total pigment content | 57.4 | 50.0 | 50.0 | 56.0 | 49.4 |
| Total binder content | 13.4 | 11.6 | 10.8 | 13.7 | 11.7 |

TABLE 1-continued

| Example no./Component | 11 | 12 | 13 | 14 | 15 |
|---|---|---|---|---|---|
| Toluylene diisocyanate | | | | | |
| Cyanoguanidine | 2.3 | | 2.7 | 2.2 | 2.4 |
| Butyl diglycol (from binder) | 1.5 | 0.5 | 1.7 | 1.4 | 1.5 |
| Hexamethylene diisocyanate | | 5.0 | | | |
| Plasticised urea resin | | | | | |
| Doped silica | 4.1 | 5.0 | 4.8 | 3.8 | 3.0 |
| Glycol ether (Dowanol ® PMA) | | | | 4.4 | |
| Glycol ether (Dowanol ® PM) | | | | | |
| Polyalkoxyalkylenetriamine | | 5.0 | 0.5 | | |
| Polyethersiloxane copolymer | | | 0.1 | | |
| Bisphenol A resin | 7.0 | 5.3 | 8.2 | 6.5 | 7.2 |
| Zinc dust | 6.8 | | | | |
| N-methylation product of γ-butyrolactam | 3.1 | | 3.4 | 2.8 | 14.1 |
| Benzoguanamine | | | | | |
| Isophorone diisocyanate | | | | | |
| Diphenylmethane diisocyanate | | | | | |
| Diacetone alcohol | 8.8 | 5.0 | 10.2 | 8.0 | 9.0 |
| Butyldiglycol acetate | 11.2 | | 5.0 | 22.4 | |
| Aromatic-rich hydrocarbon (Solvesso ® 200) | 2.3 | | 2.7 | 3.0 | 2.4 |
| Xylene | | | | 0.6 | 0.6 |
| 3-methoxybutyl acetate | | 18.3 | | | |
| Dispersion aid | 0.1 | | | | |
| Modified PE wax | | | | 0.2 | 0.2 |
| Iron phosphide | 38.5 | 41.7 | 52.6 | 41.8 | 45.0 |
| Benzyl alcohol | 11.1 | 13.3 | 5.0 | | 9.0 |
| Butanol | 1.5 | 0.5 | 1.7 | 1.4 | 1.5 |
| Epoxy-modified amine adduct | 1.6 | | 1.4 | 1.5 | 1.8 |
| Modified castor oil | 0.1 | 0.4 | | | 0.3 |
| Aluminum | | | | | |
| Molybdenum sulfide | | | | | |
| Surface-modified Ti oxide | | | | | 2.0 |
| Total solids | 60.5 | 62.4 | 70.2 | 56.0 | 61.9 |
| Total pigment content | 49.4 | 46.7 | 57.4 | 45.6 | 50.0 |
| Total binder content | 11.1 | 15.7 | 12.8 | 10.4 | 11.9 |

| Example no./Component | 16 | 17 | 18 | 19 | 20 |
|---|---|---|---|---|---|
| Toluylene diisocyanate | | 5.0 | | | |
| Cyanoguanidine | 2.2 | | 2.3 | 1.6 | 2.2 |
| Butyl diglycol (from binder) | 1.4 | 0.5 | 1.5 | 0.7 | 1.4 |
| Hexamethylene diisocyanate | | 2.0 | | 1.5 | |
| Plasticised urea resin | | | | | |
| Doped silica | 5.0 | 5.0 | 5.0 | 4.5 | 5.0 |
| Glycol ether (Dowanol ® PMA) | 4.0 | 15.0 | | 14.7 | 4.0 |
| Glycol ether (Dowanol ® PM) | | 5.5 | | 9.0 | |
| Polyalkoxyalkylenetriamine | | | | | |
| Polyethersiloxane copolymer | 0.1 | | 0.1 | | |
| Bisphenol A resin | 6.5 | 6.3 | 7.0 | 5.0 | 6.5 |
| Zinc dust | | | | | |
| N-methylation product of γ-butyrolactam | 2.8 | | 22.5 | | 2.9 |
| Benzoguanamine | | | | | |
| Isophorone diisocyanate | | | | 2.0 | |
| Diphenylmethane diisocyanate | | | | 2.0 | |
| Diacetone alcohol | 8.0 | 5.2 | 8.7 | 5.3 | 8.0 |
| Butyldiglycol acetate | 17.4 | 4.8 | | 10.0 | 17.8 |
| Aromatic-rich hydrocarbon (Solvesso ® 200) | 2.8 | | 2.4 | 2.0 | 2.8 |
| Xylene | 1.1 | | 1.8 | | 1.1 |
| 3-methoxybutyl acetate | | | | | |
| Dispersion aid | 0.4 | 0.2 | | | |
| Modified PE wax | 0.4 | | 0.6 | | 0.4 |
| Iron phosphide | 45.0 | 50.0 | 45.0 | 38.0 | 45.0 |
| Benzyl alcohol | | | | | |
| Butanol | 1.4 | 0.5 | 1.5 | 0.7 | 1.4 |
| Epoxy-modified amine adduct | 1.5 | | 1.6 | | 1.5 |
| Modified castor oil | | | | | |
| Aluminum | | | | | |
| Molybdenum sulfide | | | | 3.0 | |
| Surface-modified Ti oxide | | | | | |
| Total solids | 61.0 | 68.5 | 61.6 | 57.6 | 60.6 |
| Total pigment content | 50.0 | 55.0 | 50.0 | 45.5 | 50.0 |
| Total binder content | 11.0 | 13.5 | 11.6 | 12.1 | 10.6 |

TABLE 1-continued

| Example no./Component | 21 | 22 | 23 | 24 | 25 |
|---|---|---|---|---|---|
| Toluylene diisocyanate | | | | | |
| Cyanoguanidine | 2.3 | 2.7 | | 2.3 | 2.7 |
| Butyl diglycol (from binder) | 1.5 | 1.7 | 0.5 | 1.5 | 1.7 |
| Hexamethylene diisocyanate | | | 3.0 | | |
| Plasticised urea resin | | | | | |
| Doped silica | 4.1 | 4.8 | 5.0 | 5.0 | 4.8 |
| Glycol ether (Dowanol ® PMA) | | | | | |
| Glycol ether (Dowanol ® PM) | | | | | |
| Polyalkoxyalkylenetriamine | | | 5.0 | | 2.5 |
| Polyethersiloxane copolymer | | | | 0.1 | |
| Bisphenol A resin | 7.0 | 8.2 | 5.3 | 7.0 | 8.2 |
| Zinc dust | | | 8.7 | | |
| N-methylation product of γ-butyrolactam | 3.1 | 3.7 | | 24.3 | 1.6 |
| Benzoguanamine | | | | | |
| Isophorone diisocyanate | | | | | |
| Diphenylmethane diisocyanate | | | | | |
| Diacetone alcohol | 8.8 | 10.2 | 5.0 | 8.7 | 10.2 |
| Butyldiglycol acetate | 11.2 | 5.0 | | | 5.4 |
| Aromatic-rich hydrocarbon (Solvesso ® 200) | 2.3 | 2.7 | | 2.4 | 2.7 |
| Xylene | | | | | |
| 3-methoxybutyl acetate | | | 11.0 | | |
| Dispersion aid | 0.1 | | | 0.6 | |
| Modified PE wax | | | | | |
| Iron phosphide | 45.3 | 52.6 | 42.3 | 45.0 | 52.6 |
| Benzyl alcohol | 11.1 | 5.0 | 13.3 | | 5.0 |
| Butanol | 1.5 | 1.7 | 0.5 | 1.5 | 1.7 |
| Epoxy-modified amine adduct | 1.6 | 1.7 | | 1.6 | 0.9 |
| Modified castor oil | 0.1 | | 0.4 | | |
| Aluminum | | | | | |
| Molybdenum sulfide | | | | | |
| Surface-modified Ti oxide | | | | | |
| Total solids | 60.5 | 70.0 | 69.7 | 61.6 | 71.7 |
| Total pigment content | 49.4 | 57.4 | 56.0 | 50.0 | 57.4 |
| Total binder content | 11.1 | 12.6 | 13.7 | 11.6 | 4.3 |

| Example no./Component | 26 | 27 | 28 |
|---|---|---|---|
| Toluylene diisocyanate | | | 2.7 |
| Cyanoguanidine | 2.2 | 2.2 | |
| Butyl diglycol (from binder) | 1.3 | 1.3 | 0.5 |
| Hexamethylene diisocyanate | | | 2.7 |
| Plasticised urea resin | | | |
| Doped silica | 2.5 | 5.0 | 4.0 |
| Glycol ether (Dowanol ® PMA) | | | |
| Glycol ether (Dowanol ® PM) | | | |
| Polyalkoxyalkylenetriamine | | | 4.1 |
| Polyethersiloxane copolymer | | | |
| Bisphenol A resin | 6.5 | 6.5 | 5.3 |
| Zinc dust | | | |
| N-methylation product of γ-butyrolactam | 9.5 | 14.8 | |
| Benzoguanamine | | | |
| Isophorone diisocyanate | | | |
| Diphenylmethane diisocyanate | | | 2.7 |
| Diacetone alcohol | 8.0 | 8.0 | 5.0 |
| Butyldiglycol acetate | | | |
| Aromatic-rich hydrocarbon (Solvesso ® 200) | 2.2 | 2.2 | |
| Xylene | 1.1 | 0.6 | |
| 3-methoxybutyl acetate | | | 10.0 |
| Dispersion aid | | | |
| Modified PE wax | 0.4 | 0.2 | |
| Iron phosphide | 45.0 | 45.0 | 48.8 |
| Benzyl alcohol | 15.0 | 10.0 | 13.3 |
| Butanol | 1.3 | 1.3 | 0.5 |
| Epoxy-modified amine adduct | 2.5 | 2.5 | |
| Modified castor oil | | 0.4 | 0.4 |
| Aluminum | | | |
| Molybdenum sulfide | | | |
| Surface-modified Ti oxide | 2.5 | | |
| Total solids | 61.6 | 61.8 | 68.7 |
| Total pigment content | 50.0 | 50.0 | 53.5 |
| Total binder content | 11.6 | 11.8 | 15.2 |

What is claimed is:

1. A process for coating a metal object with an electrically conductive coating, said process comprising successively applying the following layers to at least part of the surface of the metal object:
   a) chemical conversion layer;
   b) 1 to 10 μm thick electrically conductive organic layer containing at least one organic binder and at least one electrically conductive substance in powder form;
   c) 70 to 120 μm thick powder coating layer;
   wherein the conductive organic layer b) is obtained by applying a coating composition of (A) or (B);
   said composition (A) comprising
   i) 10 to 30% by weight of an organic binder which cures at a temperature of 140 to 159° C. and preferably at a temperature of 149 to 159°;
   ii) 30 to 60% by weight of at least one electrically conductive substance in powder form, selected from zinc, aluminium, graphite, molybdenum sulfide, carbon black and iron phosphide;
   iii) 10 to 40% by weight of water and
   iv) if desired, a total of up to 30% by weight of other active or auxiliary substances, the quantities adding up to 100% by weight;
   to the metal surface provided with a chemical conversion layer a) and curing the coating composition thus applied at a peak metal temperature of 130 to 159° C., and said composition (B) comprising
   i) 5 to 40% by weight of an organic binder containing
      aa) at least one epoxy resin;
      ab) at least one hardener selected from cyanoguanidine, benzoguanamine and plasticized urea resin;
      ac) at least one amine adduct selected from polyoxyalkylene triamine and epoxy resin/amine adducts
   ii) 0 to 15% by weight of an anti-corrosion pigment;
   iii) 40 to 70% by weight of at least one electrically conductive substance in powder form, selected from zinc, aluminium, graphite, molybdenum sulfide, carbon black and iron phosphide;
   iv) 0 to 45% by weight of a solvent
   and, if desired, up to 50% by weight of other active or auxiliary substances;
   the percentages of the components adding up to 100% by weight, to the metal surface provided with a chemical conversion layer a) and curing the coating composition thus applied at a peak metal temperature (PMT) of 160 to 260° C.

2. A process for coating a metal object with an electrically conductive coating, said process comprising successively applying the following layers successively to at least part of the surface of the metal object:
   a) chemical conversion layer
   b) 1 to 10 μm thick electrically conductive organic layer containing at least one organic binder and at least one electrically conductive substance in powder form,
   c) 25 to 35 μm thick electrodeposition paint,
   d) one- or two-layer topcoat,
   wherein the conductive organic layer b) is obtained by applying a coating composition of (A) or (B),
   said composition (A) comprising
   i) 10 to 30% by weight of an organic binder which cures at a temperature of 140 to 159° C. and preferably at a temperature of 149 to 159° C., ii) 30 to 60% by weight of at least one electrically conductive substance in powder form, selected from zinc, aluminium, graphite, molybdenum sulfide, carbon black and iron phosphide, iii) 10 to 40% by weight of water and iv) if desired, a total of up to 30% by weight of other active or auxiliary substances, the quantities adding up to 100% by weight, to the metal surface provided with a chemical conversion layer a) and curing the coating composition thus applied at a peak metal temperature of 130 to 159° C., and said composition (B) comprising i) 5 to 40% by weight of an organic binder containing
   aa) at least one epoxy resin,
   ab) at least one hardener selected from cyanoguanidine, benzoguanamine and plasticized urea resin,
   ac) at least one amine adduct selected from polyoxyalkylene triamine and epoxy resin/amine adducts ii) 0 to 15% by weight of an anti-corrosion pigment, iii) 40 to 70% by weight of at least one electrically conductive substance in powder form, selected from zinc, aluminium, graphite, molybdenum sulfide, carbon black and iron phosphide, iv) 0 to 45% by weight of a solvent and, if desired, up to 50% by weight of other active or auxiliary substances, the percentages of the components adding up to 100% by weight, to the metal surface provided with a chemical conversion layer a) and curing the coating composition thus applied at a peak metal temperature (PMT) of 160 to 260° C.

3. A metal object having an electrically conductive coating, said coating being obtainable by successively applying the following layers successively to at least part of the surface of the metal object:

a) chemical conversion layer;

b) 1 to 10 μm electrically conductive organic layer containing at least one organic binder and at least one electrically conductive substance in powder form;

c) 70 to 120 μm thick powder coating layer, wherein the conductive organic layer b) is obtained by applying a coating composition of (A) or (B);

said composition (A) comprising i) 10 to 30% by weight of an organic binder which cures at a temperature of 140 to 159° C. and preferably at a temperature of 149 to 159° C.;

ii) 30 to 60% by weight of at least one electrically conductive substance in powder form, selected from zinc, aluminium, graphite, molybdenum sulfide, carbon black and iron phosphide;

iii) 10 to 40% by weight of water and iv) if desired, a total of up to 30% by weight of other active or auxiliary substances; the quantities adding up to 100% by weight;

to the metal surface provided with a chemical conversion layer a) and curing the coating composition thus applied at a peak metal temperature of 130 to 159° C., and said composition (B) comprising i) 5 to 40% by weight of an organic binder containing
   aa) at least one epoxy resin;
   ab) at least one hardener selected from cyanoguanidine, benzoguanamine and plasticized urea resin;
   ac) at least one amine adduct selected from polyoxyalkylene triamine and epoxy resin/amine adducts ii) 0 to 15% by weight of an anti-corrosion pigment;

iii) 40 to 70% by weight of at least one electrically conductive substance in powder form, selected from zinc, aluminium, graphite, molybdenum sulfide, carbon black and iron phosphide;

iv) 0 to 45% by weight of a solvent and, if desired, up to 50% by weight of other active or auxiliaty substances, the percentages of the components adding up to 100% by weight, to the metal surface provided with a chemical conversion layer a) and curing the coating composition thus applied at a peak metal temperature (PMT) of 160 to 260° C.

4. A metal object having an electrically conductive coating, said coating being obtainable by successively applying the following layers successively to at least part of the surface of the metal object:

a) chemical conversion layer b) 1 to 10 μm electrically conductive organic layer containing at least one organic binder and at least one electrically conductive substance in powder form, c) 25 to 35 μm thick electrodeposition paint, d) one- or two-layer topcoat, wherein the conductive organic layer b) is obtained by applying a coating composition of (A) or (B), said composition (A) comprising i) 10 to 30% by weight of an organic binder which cures at a temperature of 140 to 159° C., and preferably at a temperature of 149 to 159° C., ii) 30 to 60% by weight of at least one electrically conductive substance in powder form, selected from zinc, aluminium, graphite, molybdenum sulfide, carbon black and iron phosphide, iii) 10 to 40% by weight of water and iv) if desired, a total of up to 30% by weight of other active or auxiliary substances, the quantities adding up to 100% by weight, to the metal surface provided with a chemical conversion layer a) and curing the coating composition thus applied at a peak metal temperature of 130 to 159° C., and said composition (B) comprising i) 5 to 40% by weight of an organic binder containing
   aa) at least one epoxy resin,
   ab) at least one hardener selected from cyanoguanidine, benzoguanamine and plasticized urea resin,
   ac) at least one amine adduct selected from polyoxyalkylene triamine and epoxy resin/amine adducts ii) 0 to 15% by weight of an anti-corrosion pigment, iii) 40 to 70% by weight of at least one electrically conductive substance in powder form, selected from zinc, aluminium, graphite, molybdenum sulfide, carbon black and iron phosphide, iv) 0 to 45% by weight of a solvent and, if desired, up to 50% by weight of other active or auxiliary substances, the percentages of the components adding up to 100% by weight, to the metal surface provided with a chemical conversion layer a) and curing the coating composition thus applied at a peak metal temperature (PMT) of 160 to 260° C.

* * * * *

UNITED STATES PATENT AND TRADEMARK OFFICE
CERTIFICATE OF CORRECTION

PATENT NO. : 6,835,459 B2  
APPLICATION NO. : 10/275538  
DATED : December 28, 2004  
INVENTOR(S) : Lorenz et al.

Page 1 of 1

It is certified that error appears in the above-identified patent and that said Letters Patent is hereby corrected as shown below:

Title page, item (56) References Cited, Col. 2 OTHER PUBLICATIONS, line 1, delete "DmbH" and insert therefor --GmbH--.

Title page, (56) References Cited, Col. 2 OTHER PUBLICATIONS, line 5, delete "GhbH" and insert therefor --GmbH--.

Column 12, line 10, delete "coaling" and insert therefor --coating--.

Signed and Sealed this

Twenty-second Day of August, 2006

JON W. DUDAS  
*Director of the United States Patent and Trademark Office*